United States Patent [19]

Bastgen

[11] 4,142,461
[45] Mar. 6, 1979

[54] DEVICE FOR DEWATERING SLUDGE AND OTHER MATERIAL CONTAINING WATER AND SOLID PARTICLES

[75] Inventor: Wendel Bastgen, Betzdorf, Sieg, Fed. Rep. of Germany

[73] Assignee: Alb. Klein KG, Niederfischbach, Fed. Rep. of Germany

[21] Appl. No.: 778,695

[22] Filed: Mar. 17, 1977

Related U.S. Application Data

[63] Continuation-in-part of Ser. No. 477,413, Jun. 7, 1974, Pat. No. 4,019,431.

[30] Foreign Application Priority Data

Apr. 3, 1976 [DE] Fed. Rep. of Germany ... 7610510[U]

[51] Int. Cl.² ............................................. B30B 9/24
[52] U.S. Cl. .................................... 100/118; 100/153; 210/386
[58] Field of Search ................................ 100/118–120, 100/151–154, 37; 210/386, 387, 400, 401

[56] References Cited

U.S. PATENT DOCUMENTS

| | | | |
|---|---|---|---|
| 2,365,658 | 12/1944 | Schumacher | 100/153 X |
| 3,446,139 | 5/1969 | Coffelt | 100/118 |
| 3,894,486 | 7/1975 | Sparowitz et al. | 100/118 |
| 3,951,809 | 4/1976 | Kollmar | 210/386 X |

FOREIGN PATENT DOCUMENTS

| | | | |
|---|---|---|---|
| 2441241 | 3/1975 | Fed. Rep. of Germany | 210/386 |
| 499681 | 11/1954 | Italy | 100/118 |
| 2645 of | 1877 | United Kingdom | 100/118 |

*Primary Examiner*—Peter Feldman
*Attorney, Agent, or Firm*—Hane, Roberts, Spiecens & Cohen

[57] ABSTRACT

There is disclosed a device for dewatering sludge, sewage and other materials containing water and solid particles. The device comprises at least two rotatable and two superimposed power driven filter bands which are successively guided to and about the perforated cylindrical walls of the drums in pressure engagement therewith so as to drive the drums in opposite direction and causing release of water from sludge fed between the two filter bands. After leaving the last drum the bands are guided by rolls along a meandering path along which the sludge is repeatedly stretched and pressed to cause further release of water from the sludge and to discharge the now dewaterized sludge at the end of the path.

18 Claims, 1 Drawing Figure

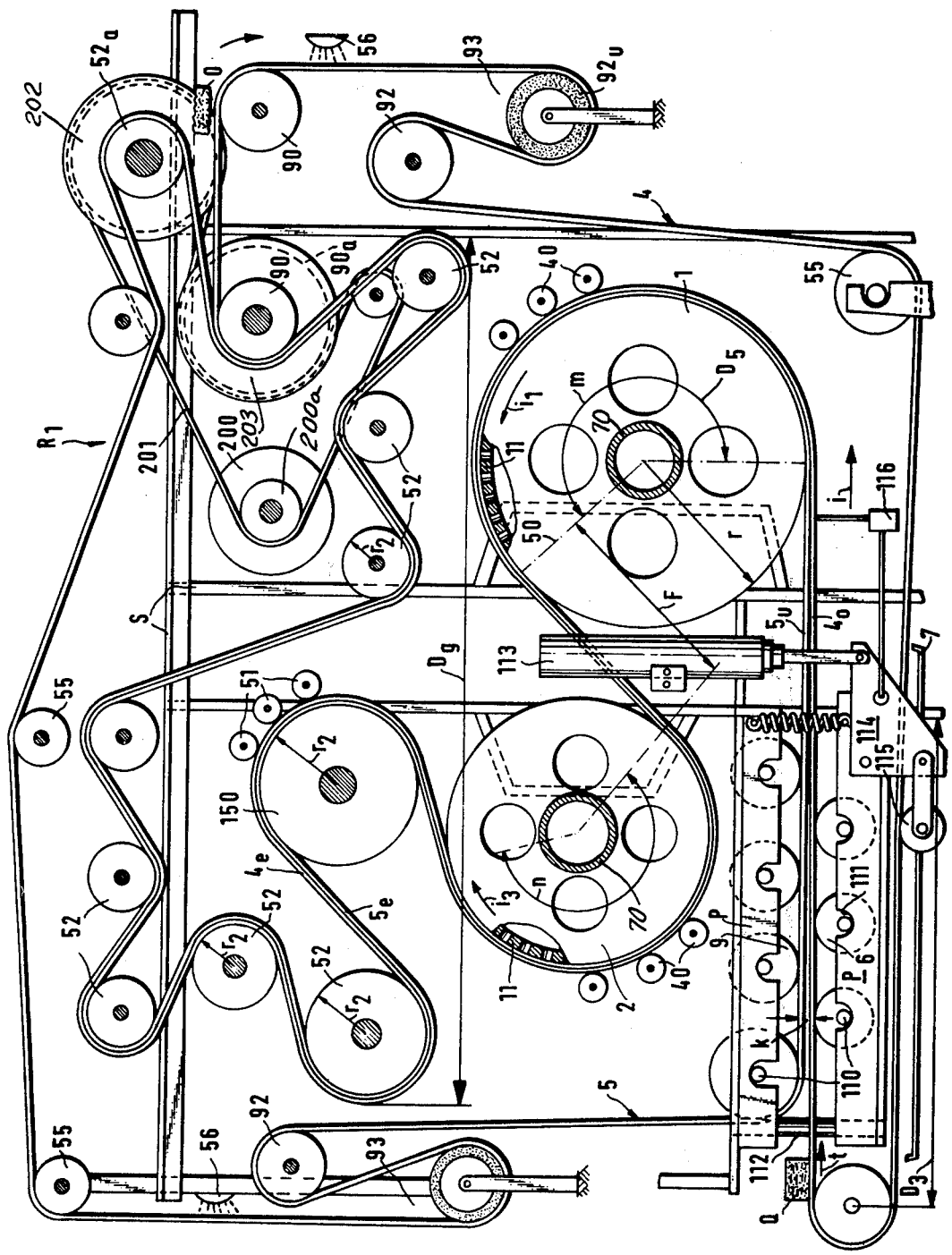

DEVICE FOR DEWATERING SLUDGE AND OTHER MATERIAL CONTAINING WATER AND SOLID PARTICLES

The present application is a continuation-in-part application based on my prior pending application Ser. No. 477,413, filed June 7, 1974, now U.S. Pat. No. 4,019,431.

BACKGROUND

There are known devices of the general type referred to, for instance, from my prior pending application Ser. No. 471,413 filed June 7, 1974 which comprise two rotatable drums and two superimposed and parallel power driven filter bands for continuously feeding sludge to be dewatered, preferably in the shape of sludge cakes, between the filter bands and for removing the sludge cakes after dewatering thereof. These bands are guided over parts of the cylindrical walls of the drums with pressure engagement in a manner so that the two drums are rotated in opposite directions. As a result of the pressure engagement of the bands with the drum walls water is pressed out of the sludge cake and escapes through the filter bands. Moreover, the filter bands are guided so that the inner filter band on the first drum becomes the outer filter band on the second drum, and vice versa, thereby further causing escape of water from the cakes.

THE INVENTION

It is a broad object of the invention to improve the effectiveness of the afore-described device with respect to the percentage of water removed from the sludge cakes to be processed in and by the device.

A more specific object of the invention is to provide a plurality of guide rolls which guide the filter bands prior to the discharge of sludge cakes fed between the bands along a meandering path repeatedly subjecting the cakes to changes in shape, thereby loosening the cakes and thus causing further release of water therefrom.

Another more specific object of the invention is to provide a discharge chute for discharging sludge cakes after dewatering thereof by spreading the filter bands temporarily as they travel along the meandering path.

Still another more specific object of the invention is to provide adjacent to and preferably above the top of the second drum guide rolls and one or more deflection rolls so that the filter bands are guided along a substantially S-shaped path and the positions of the outer and inner filter bands relative to the rolls is at least once reversed, thereby further loosening the cake structure.

A still further object of the invention is to locate the afore-referred to guide and deflection rolls above the top level of the second or last drum and at about the same level with further guide rolls which by exerting pressure upon the cakes and repeatedly stressing and bending the same cause further release of water from the cakes.

Other objects, features and advantages will be pointed out hereinafter and set forth in the appended claims constituting part of the application.

BRIEF DESCRIPTION OF THE DRAWING

In the single FIGURE of the accompanying drawing, an elevational view, partly in section, of a device for dewatering sludge, sewage and similar material containing liquid and solid particles is schematically shown by way of illustration and not by way of limitation.

DETAILED DESCRIPTION OF THE DRAWING

Referring now to the FIGURE in detail, the sludge dewatering device according to the invention is generally designated by $R_1$ and comprises two dewatering drums 1 and 2. The drums are rotatable about a horizontal axis. The cylindrical wall 11 of at least one of the drums is perforated. The purpose of the perforation, will be explained in the subsequent description. Two superimposed filter bands or belts 4 and 5 parallel to each other are guided for at least part of the travel path thereof so that they engage the two drums with pressure engagement within the range defined by angles m and n, respectively, of cylindrical segments. As shown in the FIGURE, the filter bands in effect define an S-shaped engagement with the drum walls.

While only two drums are shown, the concept of the invention encompasses also the provision of more than two drums.

The sludge to be dewatered is preferably in the form of a cake Q fed to the device $R_1$ in the feed-in direction t and is carried by filter band 4. The filter band is guided in the travel direction i and is supported by rolls 6 of a preliminary pressure zone $D_3$ which will be more fully described hereinafter. The preliminary pressure zone serves to remove part of the water contained in sludge cake Q. Water released from the sludge cake will escape through the perforations in filter band portion $4_o$ constituting the upper or outer one of the filter bands in the present stage of operation into a catch trough 7.

Support rolls 6 together with the inner filter band portion $5_u$ and pressure rolls 9, constitute the aforementioned preliminary pressure zone $D_3$. As it is evident, the action of the pressure rolls 9 will cause temporary and irregular deformations of the filter bands, which are not shown to simplify the illustration.

After passing through the preliminary pressure zone $D_3$, the two filter bands 4 and 5 with sludge cakes Q therebetween envelop the outside of the perforated cylindrical wall 11 of drum 1 in the rotational direction i, within the circumferential range of the cylinder segment as defined by envelopment angle m. The width of the angle is selected in accordance with the length of the main pressure zone $D_5$ along which the filter bands 4 and 5 are guided on and by the perforated cylindrical walls 11.

The perforated cylindrical walls of the drums may be made of suitable synthetic plastics material, and/or sheets of steel or other perforated sheet material. It is also possible and within the concept of the invention to form the cylindrical walls of a plurality of tubes which extend parallel to the axes of the drums so that there are lengthwise gaps therebetween.

The filtrate pressed out of sludge cakes will percolate through the openings in the inner filter band into the inner space of the drums from which it can be discharged in a convenient and conventional manner such as indicated by pipes 70. In case tubes are used to form the drum walls, these tubes can be so arranged that filtrate accumulating in the lower portion of the drums leaks into the tubes and is released from the same through the open face ends of the tubes.

The upper arm 50 of the cylindrical segment m constitutes the point at which the filter bands 4 and 5 leave drum 1, that is, the pressure zone $D_5$. The sludge cake Q which was heretofore bent corresponding to the radius r of the dewatering drum 1 is now suddenly straightened between the filter bands 4 and 5 due to the straight travel path of the two filter bands between the two drums as clearly seen in the drawing. As a result of such abrupt flattening of the sludge cake, portions of the cake, which were previously close to each other, are now stretched and a general loosening of the structure of the sludge cake Q is obtained.

When the filter bands 4 and 5 reach the end of their travel on the perforated wall 11 of the second dewatering drum 2 there is a substantially pressure-free zone F. This permits bending the now substantially fully loosened sludge cake Q again in the now opposite direction $i_3$. As a result, the effect of the pressure applied to the sludge cakes by the tension of the filter bands is considerably increased.

Due to the afore-described operational steps the internal structure of the cakes Q has been completely changed and as a result it is now possible to remove from the sludge cakes Q, while passing over the dewatering drum 2 additional water. Such additional removal of water would not be possible without the effect of the afore-described changes in the consistency of the cakes. Moreover, the continuous shear action caused by the filter band 4 which is now the inner filter band relative to the wall of the drum, and thus travels somewhat faster than the outer bands, makes the dewatering effect a thorough one.

The perforated dewatering drums 1 and 2 are driven by the power driven filter bands 4 and 5, as will be more fully described hereinafter, either at synchronous circumferential speed or at a slight speed differential. If such differential speed of the drums is desired, it can be readily effected in a conventional manner, either by providing different diameters for the drums or a gear train between the drums.

When the filter bands 4 and 5 leave the second dewatering drum 2, the bands, together with sludge cakes Q therebetween are both guided over a deflection drum 150 to a sequence of guide rolls 52. Planet rolls 51 may be provided to coact with deflection roll 150. Corresponding planet rolls 40 can also be provided for coaction with the drums, as it is shown in the FIGURE.

The guide rolls 52 have different radii $r_2$ and are located above dewatering drums 1 and 2 and, more specifically, so that the filter band portions $4_e$ and $5_e$ are guided along a meandering path as they leave drums 1 and 2.

The guide rolls 52, together with the filter bands 4 and 5 which are guided by the rolls, provide above the dewatering drums 1 and 2 an after-treatment zone $D_9$. From this after-treatment zone the sludge cakes Q are guided for discharge by two deflection rolls 90. The filter band 5, which is now the outer or upper one between deflection rolls 90, is now lifted relative to the other filter band 4 by a power driven deflection roll 52a and is then guided by rolls 55 through a cleaning zone 56 which coacts with a catch trough formed by two rolls 92 and filter band 5, as it is clearly shown in the FIGURE and returned to the preliminary pressure zone $D_3$.

The now lower or inner filter band 4, prior to its return to the preliminary pressure zone $D_3$ by means of deflection rolls 55, is guided to and through a catch trough 93 provided on the side of the device opposite the one on which the other trough 93 is located. The rolls $92_u$, which are disposed below the catch trough permit a re-tensioning of filter bands 4 and 5.

Reverting to the preliminary pressure zone $D_3$ the support rolls 6 at the inlet side of the device and pressure rolls 9 are carried with their axles 110 in bearing recesses 111 provided in control bars P, the open side of the recesses facing the filter bands. Control bars P are elastically tensioned relative to each other by means of spacing bolts 112. At least one control bar P can be tilted so as to vary the wedge distance k between the support rolls 6 and the pressure rolls 9 so that the pressure conditions within the preliminary pressure zone can be selected in accordance with the spacing operational requirements.

A pressure cylinder 113 controls, via a pivotal plate 114, the movement of one of the control bars P and also of a band guiding roll 115. The control of pressure cylinder 113 is effected by means of a sensing device 116 of conventional design sensing the lower filter band 4.

As stated before, the filter bands are power driven and, in turn, drive the dewatering drums. Driving of the filter bands is effected by an endless drive belt 201 which, in turn, is driven by a drive wheel 200. The sectioned axle 200a of this wheel should be visualized as the drive shaft of a suitable and conventional power drive means such as an electric motor (not shown) which may be a variable speed motor. As shown, the drive belt 201 is also guided over pulleys 202 and 203 mounted on the same drive shafts as rolls 52a and 90, respectively. A drive chain or other equivalent means may, of course, also be used.

As it is apparent both, the filter band and the drums can be power driven or either the filter band only or the drums only depending upon the operational conditions.

The entire afore-described device 1 is supported by a frame S.

While the invention has been illustrated and described as embodied in a device for dewatering sludge and other material containing water and solid particles, it is not intended to be limited to the details shown, since various modifications and structural changes may be made without departing in any way from the spirit of the present invention.

What is claimed is:

1. A device for dewatering sludge and similar material containing liquid and solid particles comprising, in combination:

at least two drums disposed substantially along a horizontal line in side by side spaced relation and rotatable in opposite directions about horizontal axes, the walls of said drums being perforated for passage of water released from sludge into said drum;

means within the perforated drums for receiving and discharging water released from the sludge;

a pair of endless filter bands disposed in superimposition for feeding sludge to be dewatered between said bands, said filter bands being first guided to and about a part of the circumferential wall of one of said drums in pressure engagement of the inner filter band therewith and then to and about part of the circumferential wall of the other drum in engagement therewith so that the positions of the filter bands relative to the walls of the drums are reversed for discharging water released from the sludge through the filter band constituting the inner band while in engagement with the respective drum into the drums and so that said drums are rotated in opposite direction;

drive means for driving the filter bands and rotating said drums;

a plurality of guide rolls disposed for guiding said superimposed filter bands upon leaving the circumferential wall of said other drum along a meandering path to effect further dewatering of the sludge through said filter bands;

a deflection roll disposed intermediate said other drum and the first guide roll of said plurality of guide rolls over and by which the filter bands are guided after leaving said other drum, said deflection roll and said first guide roll being positioned to guide the filter bands along a substantially S-shaped path as seen in elevational position relative to the drums, the said deflection roll being located above the top level of said other drum and substantially at the same level as the first guide roll of said plurality of guide rolls such that the belts pass around the periphery of the drums and the deflection roll over angles exceeding 180°; and means spreading the filter bands apart along part of their path after passage through said meandering path thereby forming a discharge chute for the dewatered sludge.

2. The device according to claim 1 and comprising a preliminary pressure zone, said pressure zone including an elongate guide track for guiding said filter band prior to being guided to and upon said one drum, and adjustable pressure means for applying pressure to the filter bands while passing through said guide track thereby preliminarily removing water from the sludge between the bands.

3. The device according to claim 1 wherein the plurality of said guide rolls is disposed in an array extending above and parallel to said drums.

4. The device according to claim 1 wherein the portions of the filter bands encompassing the peripheral walls of the drums define approximately the letter S.

5. The device according to claim 1 wherein the plurality of guide rolls includes guide rolls disposed above each of the drums.

6. The device according to claim 1 wherein said guide rolls and deflection roll are disposed so that the position of the filter bands relative to the rolls are repeatedly reversed as the filter bands are driven along said meandering path.

7. The device according to claim 5 wherein at least some of said guide rolls have decreasing diameters in the travel direction of said filter bands.

8. The device according to claim 1 wherein at least one of said filter bands is guided by said guide rolls from said discharge chute back to said drums.

9. The device according to claim 1 and comprising a preliminary pressure zone, said zone defining a guide track disposed prior to the drums in the travel direction of the filter bands, said track including pressure rollers for squeezing water out of the sludge while passing through the guide track.

10. The device according to claim 9 wherein said track further includes support rolls for supporting the filter bands while passing through the track.

11. The device according to claim 9 and comprising means for adjusting the spacing between the filter bands while the bands are passing through the track.

12. The device according to claim 9 wherein said pressure rollers are detachably secured to a control bar, the position of said bar controlling the pressure applied by the pressure rollers to the filter bands, and setting means for selectively changing the position of said control bar.

13. The device according to claim 12 wherein sensing means control said setting means corresponding to the tension of the filter bands.

14. The device according to claim 1 comprising an elongated guide track for guiding said filter bands prior to being guided to and upon said one drum, and adjustable pressure means for applying pressure to the filter bands while passing through said guide track, thereby removing water from the sludge between the bands, said guide track being disposed below said drums, the filter band being the lower one relative to said drum walls being guided so as to protrude from said other drum, said protruding portion of the inner filter band constituting the feed-in part of the filter bands.

15. The device according to claim 1 wherein said drive means comprises a power driven drive belt, said belt driving at least one of the guide rolls guiding said filter bands, thereby causing said driven guide roll to drive the filter bands which, in turn, drive the drums.

16. The device according to claim 1 wherein said drive means comprises at least one power driven drive belt coupled to one of said drums for driving the same, thereby causing the driven drum to drive the filter bands in engagement therewith which, in turn, drive the other drum.

17. The device according to claim 1 wherein one of the bands is driven at a greater speed than the other band.

18. A device for dewatering sludge and similar material containing liquid and solid particles comprising, in combination:

first and second drums disposed substantially along a horizontal line in side by side spaced realtion and rotatable in opposite directions, said drums having perforatted walls for passage of water released from sludge into said drum;

a pair of endless filter bands disposed in superimposition for feeding sludge to be dewatered between said bands, means defining a preliminary pressure zone, said filter bands being first guided to said preliminary pressure zone and then to said drums, said means which defines said preliminary pressure zone including an elongate guide track for guiding said filter bands and adjustable pressure means for applying pressure to the filter bands while passing through said guide track thereby removing water from the sludge between the bands, said filter bands being guided from the pressure zone to and about a part of the circumferential wall of said first drum in pressure engagement of the inner filter band therewith and then to and about part of the circumferential wall of the second drum in engagement therewith so that the positions of the filter bands relative to the walls of the drums are reversed for discharging water released from the sludge through the filter band constituting the inner band while in engagement with the respective drum into the drums and so that said drums are rotated in opposite direction;

a plurality of guide rolls disposed above the drums for guiding said superimposed filter bands upon leaving the circumferential wall of said other drum along a meandering path to effect further dewatering of the sludge through said filter bands;

a deflection roll disposed intermediate said second drum and the first guide roll of said plurality of guide rolls over and by which the filter bands are guided after leaving said second drum, said deflection roll and said first guide roll being positioned to guide the filter bands along a substantially S-shaped path as seen in elevational position relative to the drums, drive means for driving the filter bands and rotating said drums; and means for spreading the filter bands apart along part of their path thereby forming a discharge chute for the dewatered sludge.

* * * * *